Patented June 14, 1927.

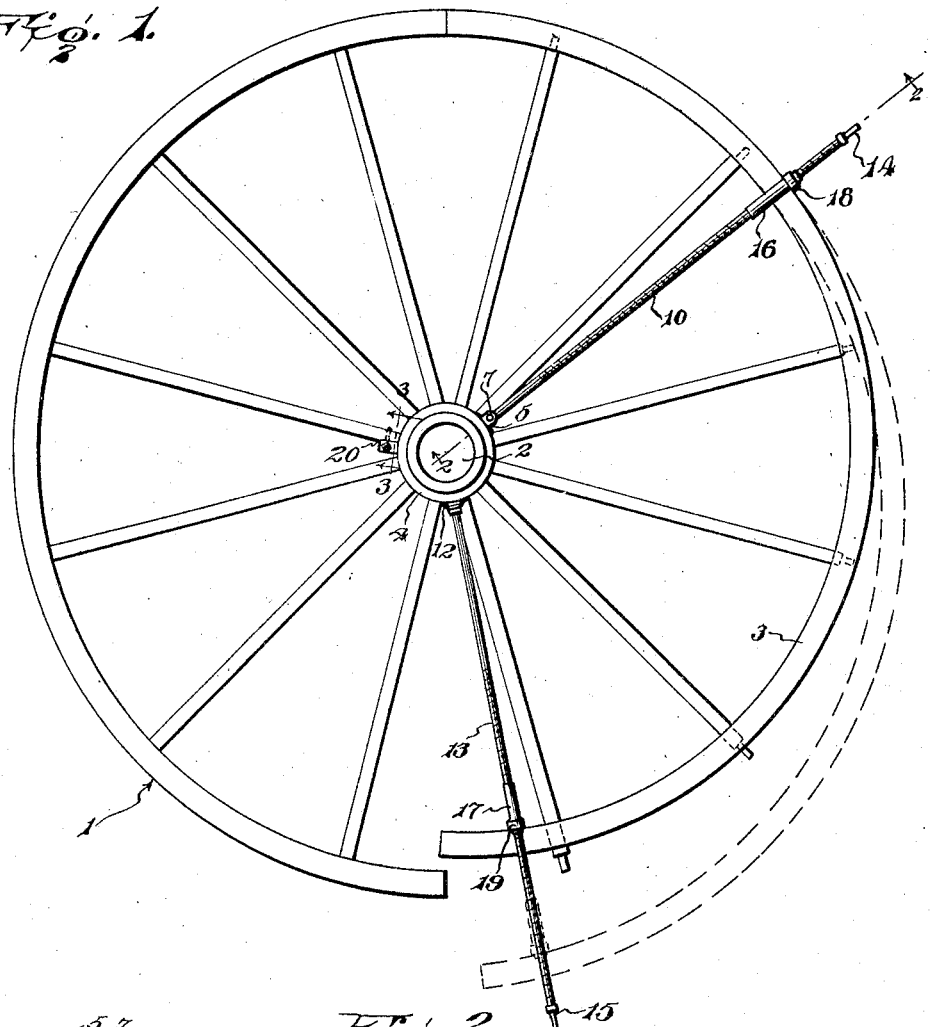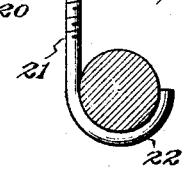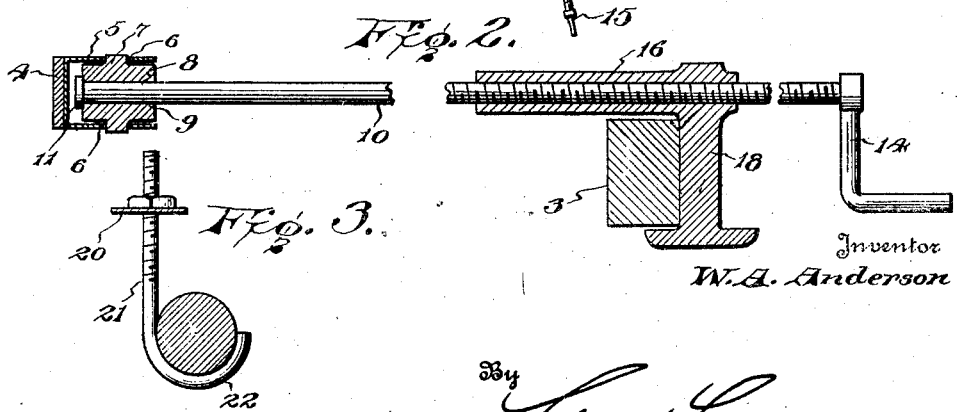

1,632,263

UNITED STATES PATENT OFFICE.

WILLIAM A. ANDERSON, OF KANORADO, KANSAS.

DEVICE FOR EXPANDING WHEEL RIMS.

Application filed February 9, 1927. Serial No. 167,010.

The present invention is directed to improvements in devices for expanding wheel rims.

The primary object of the invention is to provide a device of this character so constructed that it can be easily and quickly secured to the wheel and when in place thereon can be conveniently operated to expand the wheel rim.

Another object of the invention is to provide a device of this kind which is extremely simple in construction and one which can be manufactured at a minimum cost.

In the accompanying drawing:

Figure 1 is a plan view of the device, showing the same in an operative position upon a wheel.

Figure 2 is a sectional view on line 2—2 of Figure 1.

Figure 3 is a sectional view on line 3—3 of Figure 1.

Referring to the drawing, 1 designates a wheel including the usual hub 2 and rim 3. The device used for expanding the rim in order that the same can be properly fixed to the spokes comprises a band 4 adapted to engage the hub 2, as shown in Figure 1. Suitably fixed to the band 4 is a sheet metal yoke 5 having bearings 6 in its side arms and in which are journaled the trunnions 7 of the collar 8, said collar having a longitudinal bore 9 in which is rotatably engaged the inner end of the screw shaft 10, outward movement thereof being limited by the head 11 formed upon the inner end of said shaft. By providing the trunnions 7 the collar 8 is permitted to rock. Also fixed to the band 4 is a bearing 12 in which is swiveled the inner end of the screw shaft 13. The shafts 10 and 13 are provided upon their outer ends with cranks 14 and 15, respectively and through the medium of which the rotary movement is imparted to said shafts.

Threaded upon the shafts 10 and 13 are sleeves 16 and 17, said sleeves being provided with rim engaging heads 18 and 19, respectively.

In operation, the band 4 is placed upon the hub 2 and the head 18 engaged upon the outer side of the rim 3 and upon rotating the shaft 10 said head is caused to bindingly engage the rim to hold the same firmly engaged against spokes at certain points. The head 19 is engaged with the inner side of the rim 1 and upon rotating the shaft 13 said head will be moved outwardly, thus moving the rim to the position as indicated by dotted lines in Figure 1 of the drawing. The shaft 13 is then rotated in a direction to force the head 19 inwardly in order that the expanding portion of the rim can be engaged with the spoke ends.

A plate 20 is fixed to the band 4 and has secured thereto the shank 21 of the hook 22, said hook being adapted to engage one of the spokes 23 to maintain the band in place upon the hub.

Having thus described the invention, I claim:

1. A device of the class described, comprising a band for engagement with a wheel hub, screw shafts having their inner ends rotatably engaged with the band, and heads adjustable upon the shafts for engagement with the rim of the wheel.

2. A device of the class described, comprising a band for detachable engagement with the hub of a wheel, heads adjustable upon the shafts for engagement, respectively, with the inner and outer sides of the rim of the wheel, and means carried by the band for maintaining the same upon the hub.

3. A device of the class described, comprising a band for attachment to a wheel hub, a yoke carried by the band, a screw shaft having its inner end pivotally and rotatably engaged with the yoke, a second screw shaft having its inner end rotatably engaged with the band, a hook carried by the band for engagement with a spoke of the wheel for maintaining the band upon the hub thereof, and heads adjustably mounted upon the shafts for longitudinal movement, said heads being engaged, respectively, with the inner and outer sides of the rim of the wheel, and means for rotating the shafts for effecting adjustment of the heads thereon.

In testimony whereof I affix my signature.

WILLIAM A. ANDERSON. [L. S.]